(12) United States Patent
Frederick, Jr. et al.

(10) Patent No.: US 6,266,768 B1
(45) Date of Patent: Jul. 24, 2001

(54) SYSTEM AND METHOD FOR PERMITTING OUT-OF-ORDER EXECUTION OF LOAD INSTRUCTIONS

(75) Inventors: Marlin Wayne Frederick, Jr., Cedar Park; Bruce Joseph Ronchetti; Larry Edward Thatcher, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/213,323

(22) Filed: Dec. 16, 1998

(51) Int. Cl.[7] ........................................................ G06F 7/38
(52) U.S. Cl. ..................... 712/220; 712/210; 712/218; 712/244; 712/205
(58) Field of Search ................................... 712/220, 218, 712/204, 205, 244, 210

(56) References Cited

U.S. PATENT DOCUMENTS

| | | | | |
|---|---|---|---|---|
| 5,247,628 | * | 9/1993 | Grohoski | 712/214 |
| 5,619,662 | * | 4/1997 | Steely, Jr. et al. | 712/216 |
| 5,931,957 | * | 8/2000 | Konigsburg et al. | 714/48 |

* cited by examiner

*Primary Examiner*—Richard Hjerpe
*Assistant Examiner*—Mackly Monestime
(74) *Attorney, Agent, or Firm*—Kelly K. Kordzik; Winstead Sechrest & Minick P.C.; Anthony V. S. England

(57) ABSTRACT

In a load/store unit within a microprocessor, load instructions are executed out of order. The load instructions are assigned tags in a predetermined manner, and then assigned to a load reorder queue for keeping track of the program order of the load instructions. Then when new load instructions are issued, the new load instructions are compared to entries within the load reorder queues to detect out of order problems.

16 Claims, 5 Drawing Sheets

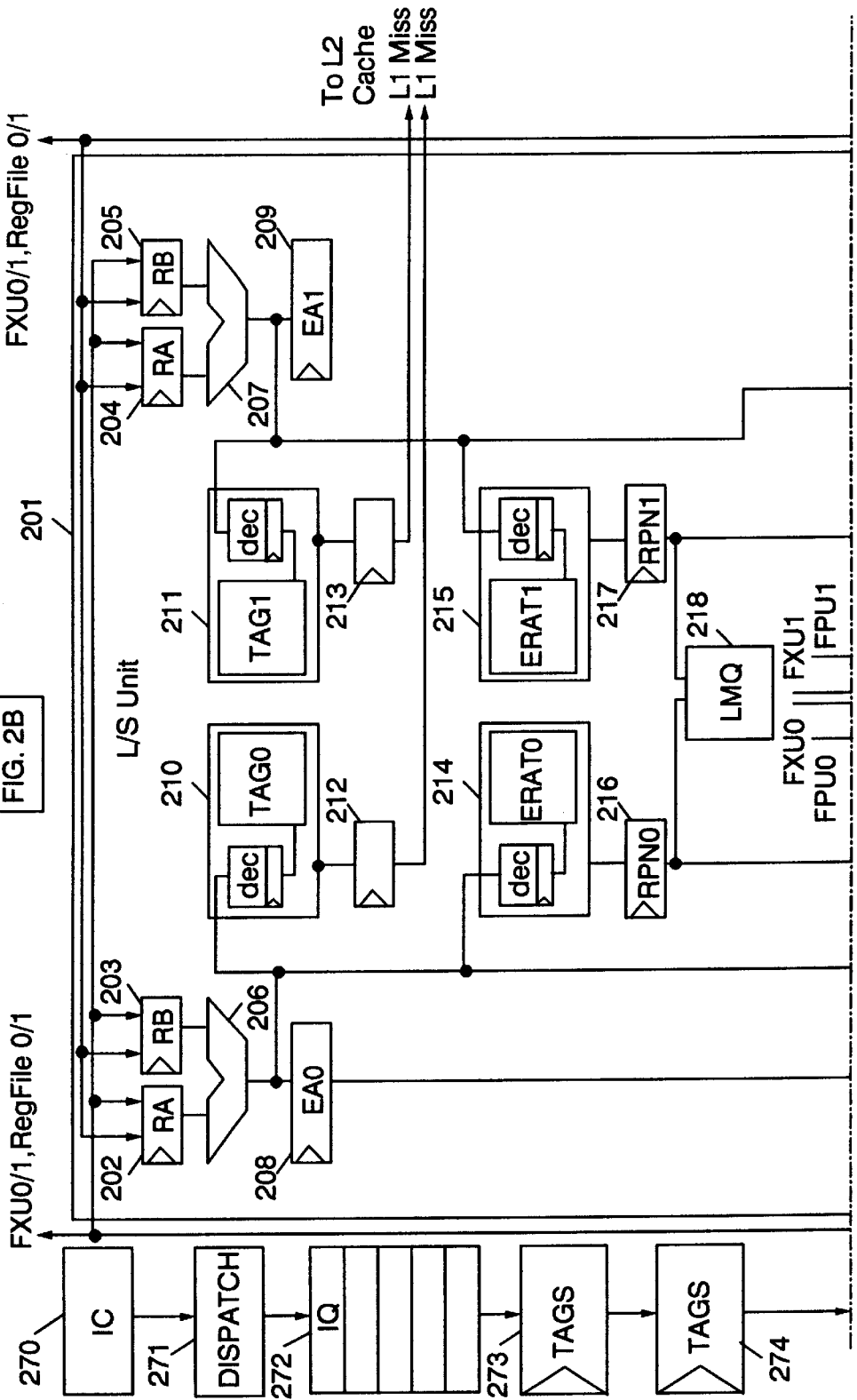

SYSTEM AND METHOD FOR PERMITTING OUT-OF-ORDER EXECUTION OF LOAD INSTRUCTIONS

TECHNICAL FIELD

The present invention relates in general to data processing systems, and in particular, to the execution of out-of-order load instructions in a processor.

BACKGROUND INFORMATION

In order to increase the operating speed of microprocessors, architectures have been designed and implemented that allow for the out-of-order execution of instructions within the microprocessor. An advantage of out-of-order execution of instructions is that it allows load miss latencies to be hidden while useful work is being performed. However, traditionally, load and store instructions have not been executed out of order because of the very nature of their purpose.

Generally, it is architecturally impermissible for a load instruction, which is subsequent in program order to a previous load instruction to return "older" data, which can occur if load instructions are permitted to be executed out of order. Nevertheless, techniques have been implemented to attempt to execute load instructions out of order. However, such techniques have often required too many processor cycles to execute. As microprocessor speeds continually increase, there is a need in the art for an ability to execute in parallel such load instructions and to correct for such problems as described above in a more efficient and faster manner.

SUMMARY OF THE INVENTION

The present invention provides a mechanism to allow out-of-order load execution and a means to recover from problems which occur from such execution in an efficient manner. For example, one problem occurs when a snoop invalidate for the associated cache line occurs between execution of the two load instructions. Herein, a snoop invalidate means a signal received from the memory hierarchy indicating that another bus device (e.g. another processor) has obtained ownership of the cache line.

The present invention addresses the foregoing need by tagging load and store instructions and then maintaining entries in separate queues for the load and store instructions, in conformance with the assigned tags.

At instruction dispatch, each load instruction is assigned an LTAG (load tag), where the LTAG is incremented by a preceding load instruction (in program order). Addresses are queued in a load reorder queue in position relative to their LTAG. Conflicts can then be detected since the relative program order is known at address generation time.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIGS. 2A and 2B illustrate a load/store unit configured in accordance with the present invention;

DETAILED DESCRIPTION

Figure 1:
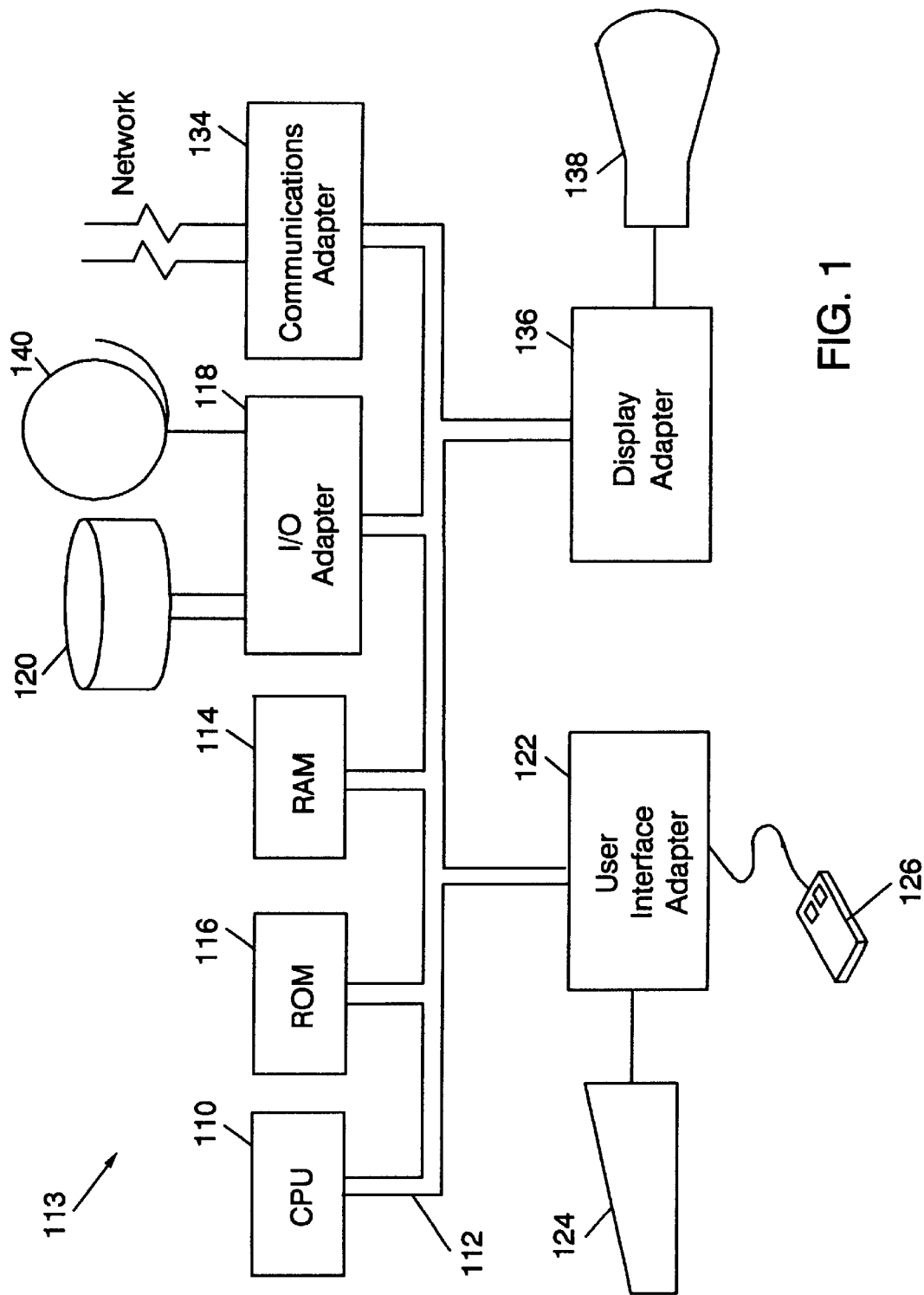
FIG. 1 illustrates a data processing system configured in accordance with the present invention.

The present invention provides for the out-of-order execution of load and store instructions, whereby load instructions are executed speculatively to hide load miss latencies. A load reorder queue is utilized to catch the instances where a younger load instruction is executed before an older load instruction, whereby the two instructions have an address byte overlap and a snoop invalidate occurred between execution of the two load instructions. This load-hit-load detection is performed by the load reorder queue using the tagging method described herein.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

A representative hardware environment for practicing the present invention is depicted in FIG. 1, which illustrates a typical hardware configuration of workstation 113 in accordance with the subject invention having central processing unit (CPU) 110, and a number of other units interconnected via system bus 112. CPU 110 embodies the load/store unit 201 of the present invention as described below. Workstation 113 includes random access memory (RAM) 114, read only memory (ROM) 116, and input/output (I/O) adapter 118 for connecting peripheral devices such as disk units 120 and tape drives 140 to bus 112, user interface adapter 122 for connecting keyboard 124, mouse 126, and/or other user interface devices such as a touch screen device (not shown) to bus 112, communication adapter 134 for connecting workstation 113 to a data processing network, and display adapter 136 for connecting bus 112 to display device 138. CPU 110 may include other circuitry (other than load/store unit 201) not shown herein, which will include circuitry commonly found within a microprocessor, e.g., execution unit, bus interface unit, arithmetic logic unit, etc. CPU 110 may also reside on a single integrated circuit.

Figure 2B:
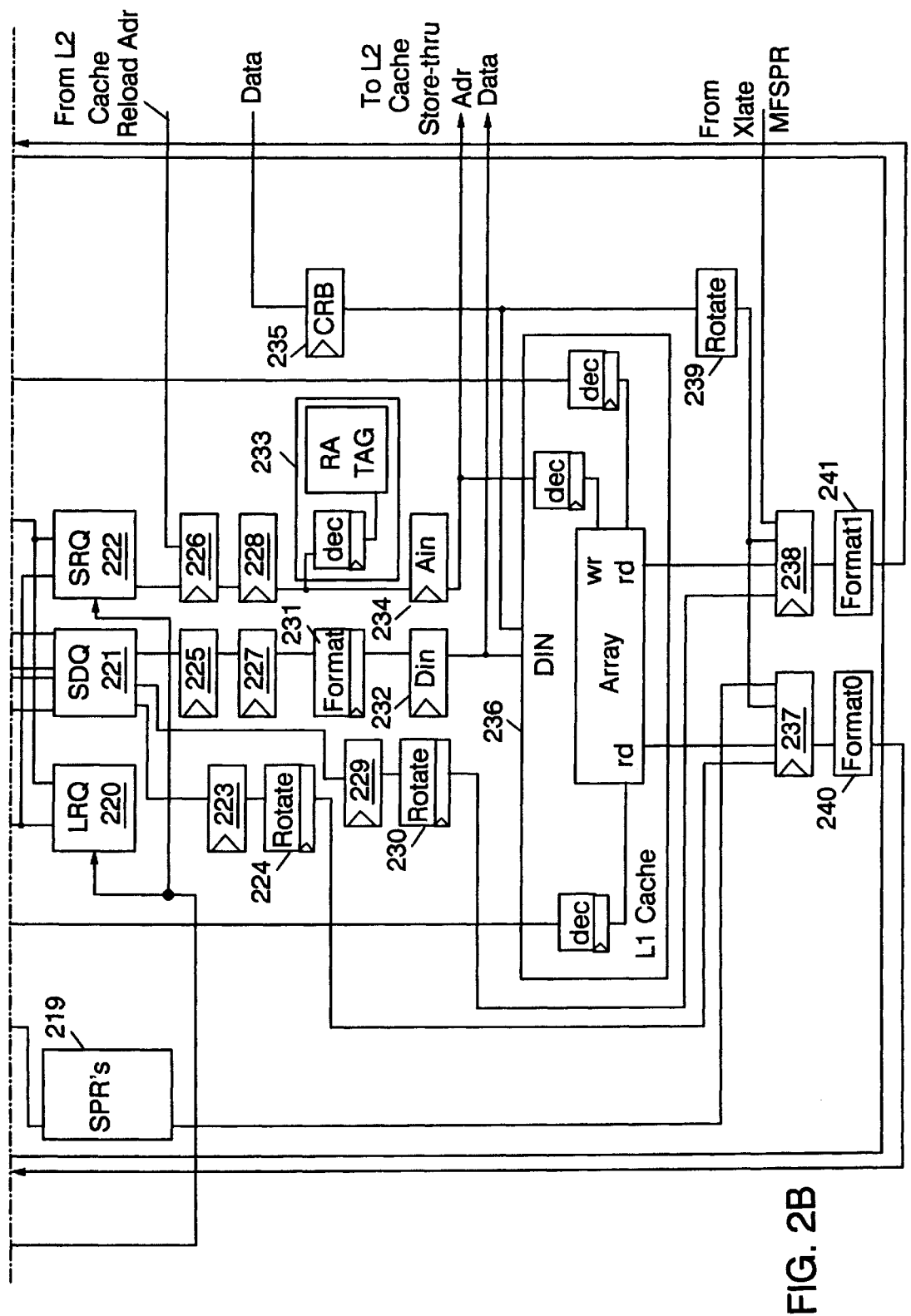

FIG. 2 (FIGS. 2A and 2B) illustrates load/store (L/S) unit 201 configured in accordance with the present invention. L/S unit 201 is located within CPU 110, which may be configured in accordance with typical microprocessor architectures.

L/S unit 201 has two pipelines so that two load or store instructions can be issued per machine cycle. Registers 202–205 receive instructions from fixed point units (FXUs) 0 and 1 (not shown) in a manner well-known in the art. 64-bit adder 206 adds operands received from registers 202 and 203, while 64-bit adder 207 adds operands from registers 204 and 205 to produces a pair of 64-bit effective addresses. These effective addresses are outputted to registers 208 and 209, respectively. Registers 208 and 209 capture the effective addresses (EA). They then both feed LMQ 218, LRQ 220 and SRQ 222, which all need a portion of the EA in addition to the real address from registers 216 and 217 to perform address checking. Additionally, the effective addresses are decoded to access tag arrays 210 and 211 to determine if there is a hit or a miss within L1 cache 236. If there is a miss, then the addresses are passed through registers 212 and 213 and sent to the L2 cache (not shown).

Furthermore, the effective addresses are sent from adders 206 and 207 to be decoded and to access the effective real address translator (ERAT) arrays 214 and 215, respectively, which output translated addresses through registers 216 and 217.

Further, the effective addresses from adders 206 and 207 access the L1 cache 236 for the load operation after being decoded by the decoders within the L1 cache 236. If there is a hit in the L1 cache 236, then the data is read out of the L1 cache 236 into registers 237, 238, and formatted by formatters 240, 241, and returned on the result bus to be sent to a register file (RegFile) (not shown). The cache line read out of L1 cache 236 is also returned into the registers 202–205 for operations that are dependent on the result as an operand.

Essentially, the three cycles performed within L/S unit 201 are the execute cycle (where the addition is performed), the access cycle (where access to the arrays is performed), and the result cycle (where the formatting and forwarding of data is performed).

If there is a miss in the cache, the request is then sent down to the L2 cache (not shown). The load miss queue (LMQ) 218 waits for the load data to come back from the L2 cache (not shown). The data associated with that cache line is loaded into the L1 cache 236.

These load operations can be performed speculatively and out of order. Store instructions are also executed out of order. Store instructions are run through the translation operation in translators 214, 215, then inserted into the store data queue (SDQ) 221 for storage into the L1 cache 236 after the instructions have been completed. Therefore, store instructions are executed out of order, but written into the L1 cache 236 in order.

The store reorder queue (SRQ) 222 keeps track of store instructions that have been executed. SRQ 222 maintains the store instructions in the queue and determines when the data is available in the store data queue (SDQ) 221 and when the store instruction is next to complete. The store to the L1 cache 236 is then completed.

Many of the registers 223, 225–229, and 237–238, are utilized for timing.

Cache lines within the L1 cache 236 are accessed based on the effective address of the cache line. The RA tag array 233 keeps track of where in the L1 cache 236 a cache line was written. The format block 231 takes the data from the SDQ 221 and rotates it properly to write into the correct byte positions in the L1 cache 236 upon execution of the store instruction. Rotate blocks 224 and 230 are utilized for store forwarding. Therefore, if there is a store instruction that is sitting in the store queue and has not been written into the queue yet because it is not next to complete, and then a younger load instruction is received that needs that data, the data will be forwarded to the load instruction being executed.

Rotate block 239 is utilized to rotate data received from the L2 cache (not shown) in response to an L1 cache miss, for forwarding the data from the L2 cache on to the result bus for forwarding to the proper register file.

Block 219 contains a number of special purpose registers to store data as a result of special purpose register instructions and read data from these registers so they get into the normal pipeline.

Register 235 is implemented for timing purposes to stage data from the L2 cache (not shown). Format blocks 240 and 241 format (or shift) cache data into the proper byte positions for the load result to the register file.

Figure 3:
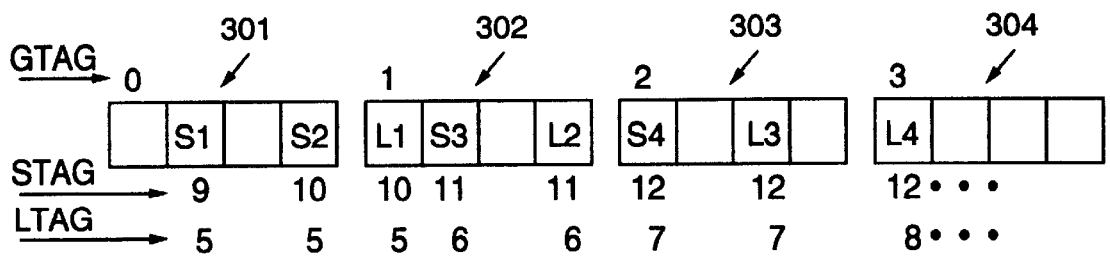
FIG. 3 illustrates a tagging method in accordance with the present invention.

Referring next to FIG. 3, there is illustrated a diagram of a method for assigning tags to load and store instructions in accordance with the present invention. Instructions are received from the instruction cache 270 by the instruction dispatch unit 271, which assigns tags to the load and store instructions as described herein. The instructions are then temporarily stored in the instruction queue 272. Tags 273 and 274 are pipeline registers used for timing purposes. 16 instructions in blocks of 4 (blocks 301–304) are analyzed at a time for the load/store tagging method of the present invention. Each block 301–304 is assigned a group tag (GTAG). Each store instruction is assigned an STAG and an LTAG. The STAG is incremented by a preceding store instruction (in program order), and the LTAG is incremented by preceding load instructions. Similarly, the LTAG is incremented by a preceding load.

For example, the program order of the store instructions are S1, S2, S3, and S4. Store instruction S1 has an STAG of 9. The next store instruction S2 is then assigned an STAG of 10. The next store instruction S3 has an STAG of 11, and then the STAG is incremented to a 12 for the next store instruction S4. The load instructions L1, L2, L3, and L4 (in program order) are assigned the STAGs of the previous store instruction. Therefore, load instruction L1 receives an STAG of 10, which is the same STAG as the preceding store instruction S2. Load instruction L2 receives an STAG of 11, which is the same STAG as the preceding store instruction S3. Load instruction L3 receives an STAG of 12, which is the same STAG as the preceding store instruction S4. Load instruction L4 also receives an STAG of 12, since the STAG that immediately precedes the load instruction L4 is still the store instruction S4 having an STAG of 12.

The LTAGs for the store instructions are incremented based on the LTAG of a preceding load instruction. As a result, the LTAG for store instruction S3 is incremented to 6 because the LTAG for the preceding load instruction L1 is 5. The LTAGs are not incremented until the next store instruction S4 which is assigned an LTAG of 7 based on the previous LTAG of 6 for the load instruction L2. LTAGs are also incremented by a preceding load instruction. Therefore, the LTAG for load instruction L4 is assigned an 8 because the LTAG for the preceding load instruction L3 is a 7.

Figure 4:
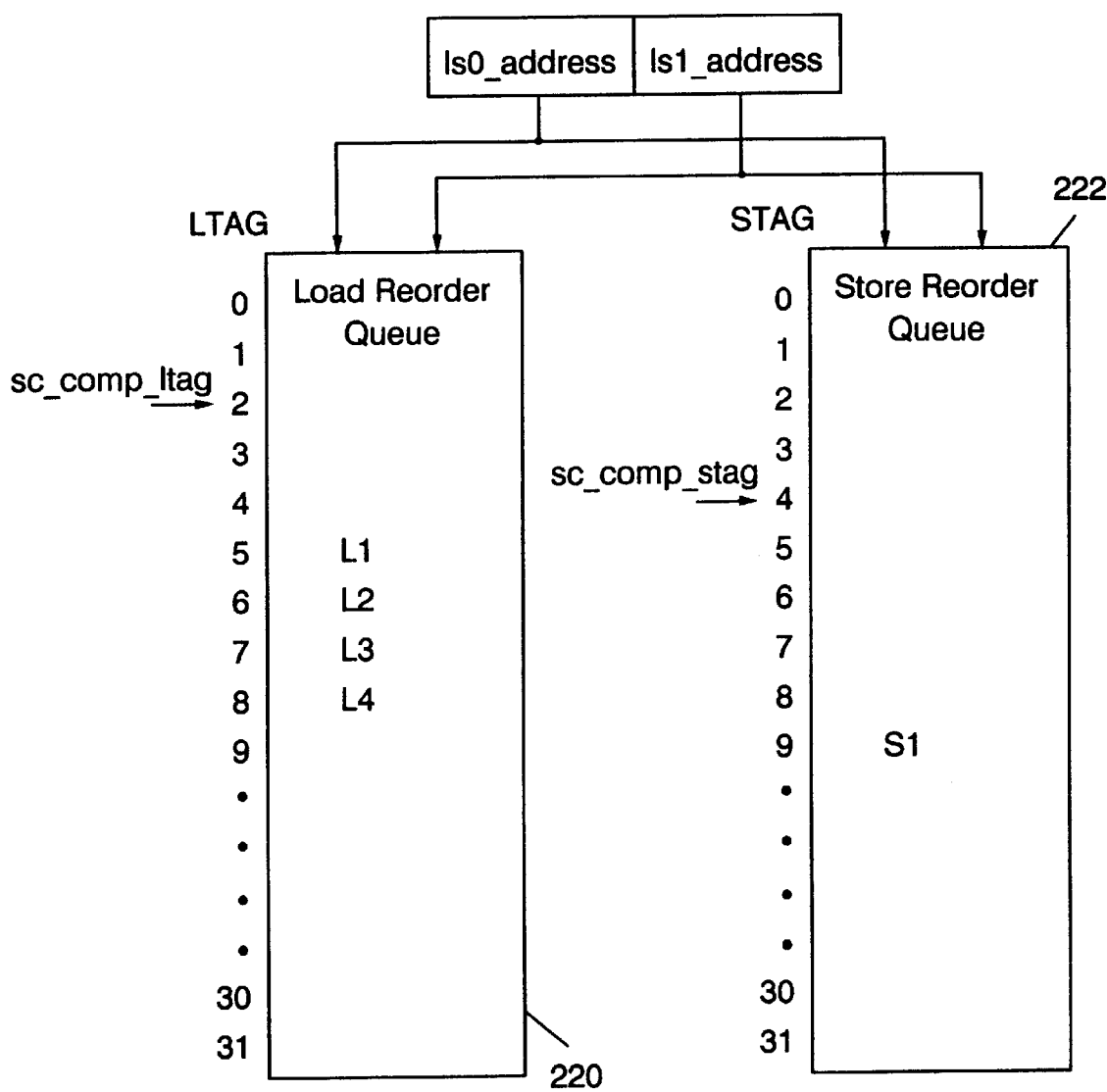
FIG. 4 illustrates ordering of load and store instructions in a load reorder queue and a store reorder queue, respectively.

Referring next to FIG. 4, the addresses for the load store unit 0 (1s1_address) and the load store unit 1 (1s1_address) are queued in the load reorder queue 220 and the store reorder queue 222 in position relative to their LTAG (STAG). The pointers sc_comp_1tag and sc_comp_stag for the LRQ 220 and SRQ 222, respectively, indicate the last load or store instruction to complete, respectively.

As an example, load instruction L1 is placed in a position in LRQ 220 corresponding to its LTAG assignment of 5.

Figure 5:
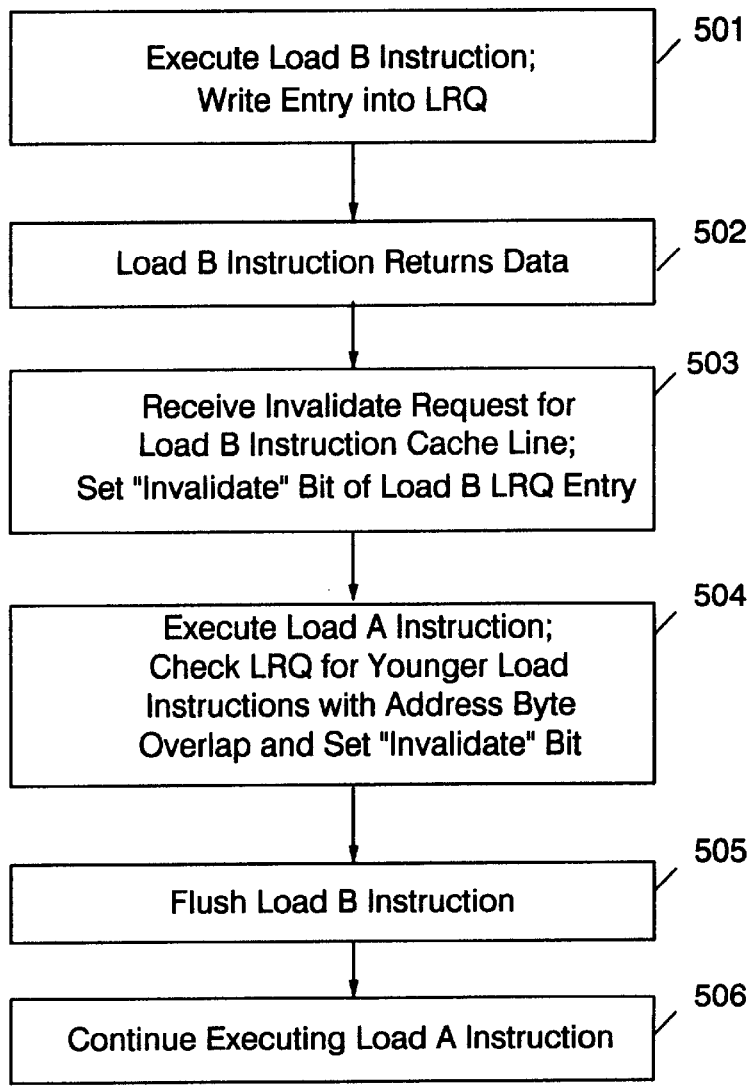
FIG. 5 illustrates a flow diagram in accordance with the present invention.

Referring to FIG. 5, assume there are two load instructions, Load A and Load B, where Load A is before Load B in program order, and there is an address byte overlap between the two load instructions. With out-of-order execution, Load B can execute first (step 501), and assume that Load B hits in the L1 cache 236 and returns load data in step 502. An entry corresponding to the Load B instruction will be written into the LRQ 220. Thereafter, assume due to cache coherency protocols, an invalidate request to the cache line corresponding to the Load B instruction is received. This may occur if system 113 is a multiprocessor system having more than one CPU. An invalidate bit will be set corresponding to the entry for the Load B instruction within the LRQ 220 (step 503). Next, the older Load A instruction executes in step 504, misses in the L1 cache 236 since the line was previously invalidated, and sends a request to the L2 cache (not shown). The data that is returned from the L2 cache is potentially different from the data that was earlier returned by the Load B instruction. This is not architecturally allowed.

The LRQ 220 is checked for younger load instructions with address byte overlap and the set invalidate bit. Since these are true with respect to the Load A and Load B instructions, the LRQ 220 is used to detect this case and flush the younger load in step 505.

The LRQ 220 has three ports: one for sequential load consistency (SLC) checking and entry writing from load/store engine 0 (1s0); one for SLC checking and entry writing from load/store engine 1 (1s1); and one for checking against an invalidate request for an address line match to an existing LRQ entry. When a load instruction executes, it is presented to the LRQ for two purposes: to check against the LRQ for younger loads which have executed and have an address byte overlap and are exposed to a sequential load consistency (a load is exposed to SLC if its LRQ entry has its invalidate bit set); to write into an LRQ entry based on its LTAG so that it can be checked against by loads executed subsequent to it. The third port does a line address compare of the invalidate request versus each valid LRQ entry to see if a valid load has had its line invalidated. If it has, an invalidate bit is set in the LRQ entry which indicates this state. This bit is used as part of the SLC check preformed on loads at execute time.

Thereafter, in step 506, execution of Load A is continued.

Although the present invention and its advantages have been described in detail, it should be understood that various changes, substitutions and alterations can be made herein without departing from the spirit and scope of the invention as defined by the appended claims.

What is claimed is:

1. A method for executing instructions in a load/store unit, comprising the steps of:
   issuing a first instruction for execution;
   issuing a second instruction for execution, wherein the first instruction is logically older than the second instruction in program order;
   assigning a first tag to the first instruction;
   assigning a second tag to the second instruction;
   assigning an entry in a load reorder queue to the second instruction as a function of a value of the second tag;
   executing the first instruction subsequent to the second instruction;
   comparing the first instruction to entries in the load reorder queue that have an address byte overlap with the first instruction;
   determining that the first instruction is older than the second instruction and that the first and second instructions have the address byte overlap; and
   flushing the second instruction.

2. The method as recited in claim 1, wherein the first instruction is a store instruction and the second instruction is a load instruction.

3. The method as recited in claim 1, wherein the first instruction is a first load instruction and the second instruction is a second load instruction.

4. The method as recited in claim 3, wherein a cache line retrieved by the second instruction is invalid.

5. The method as recited in claim 4, wherein store tags are incremented for each store instruction in program order, and wherein store tags are incremented for each store instruction in program order that is preceded by a load instruction.

6. The method as recited in claim 5, wherein load tags are not incremented for a store instruction that is preceded by a store instruction.

7. The method as recited in claim 4, wherein load tags are incremented for each load instruction in program order that is preceded by a load instruction.

8. The method as recited in claim 1, wherein the determining step further determines if a snoop invalidate has been received pertaining to the address byte overlap.

9. A load/store unit, comprising:
   circuitry for receiving a first load instruction for execution, wherein the first load instruction has been assigned a first tag;
   circuitry for receiving a second load instruction for execution, wherein the first load instruction is logically older than the second load instruction in program order, wherein the second load instruction has been assigned a second tag;
   circuitry for executing the second load instruction;
   a load reorder queue having an entry corresponding to the second load instruction as a function of a value of the second tag;
   a load miss queue entry indicating that a cache line corresponding to the second load instruction is invalid;
   circuitry for executing the first load instruction subsequent to the second load instruction;
   circuitry for determining that the first load instruction is older than the second load instruction by comparing the first tag with the second tag in the load reorder queue;
   circuitry for determining that the first and second load instructions have an address byte overlap; and
   circuitry for flushing the second load instruction.

10. The load/store unit as recited in claim 9, wherein store tags are incremented for each store instruction in program order, and wherein store tags are incremented for each store instruction in program order that is preceded by a load instruction.

11. The load/store unit as recited in claim 10, wherein load tags are not incremented for a store instruction that is preceded by a store instruction.

12. The load/store unit as recited in claim 11, wherein load tags are incremented for each load instruction in program order that is preceded by a load instruction.

13. The load/store unit as recited in claim 9, further comprising circuitry for determining that a snoop invalidate has been received pertaining to the address byte overlap.

14. A data processor comprising:
   an instruction cache;
   a dispatch unit for receiving first and second load instructions from the instruction cache, wherein the first load instruction is logically older than the second load instruction in program order, the dispatch unit assigning a first tag to the first load instruction and a second tag to the second load instruction; and a load/store unit further comprising:
- circuitry for receiving the first load instruction from the dispatch unit;
- circuitry for receiving the second load instruction from the dispatch unit;
- circuitry for executing the second load instruction;
- a load reorder queue having an entry corresponding to the second load instruction as a function of a value of the second tag;
- a load miss queue entry indicating that a cache line corresponding to the second load instruction is invalid;
- circuitry for executing the first load instruction subsequent to the second load instruction;
- circuitry for determining that the first load instruction is older than the second load instruction by comparing the first tag with the second tag in the load reorder queue;
- circuitry for determining that the first and second load instructions have an address byte overlap; and
- circuitry for flushing the second load instruction.

15. The data processor as recited in claim 14, wherein the first and second load instructions address a same cache line.

16. The data processor as recited in claim 15, further comprising:
- circuitry for determining that a snoop invalidate has been received with respect to the same cache line.

* * * * *